March 9, 1937.  G. F. KNOWLES  2,073,536
SIGNAL DEVICE FOR VEHICLES
Filed Dec. 2, 1935
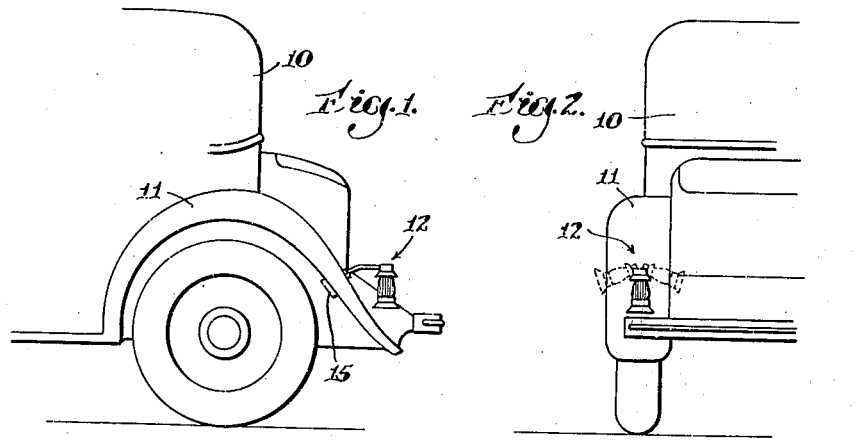
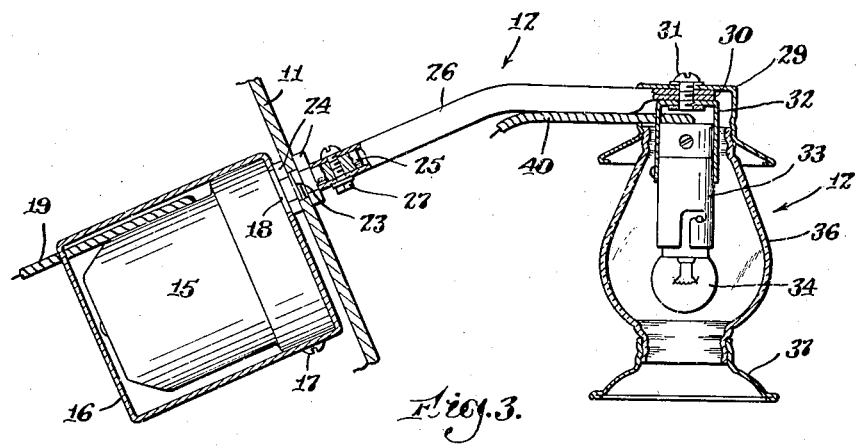
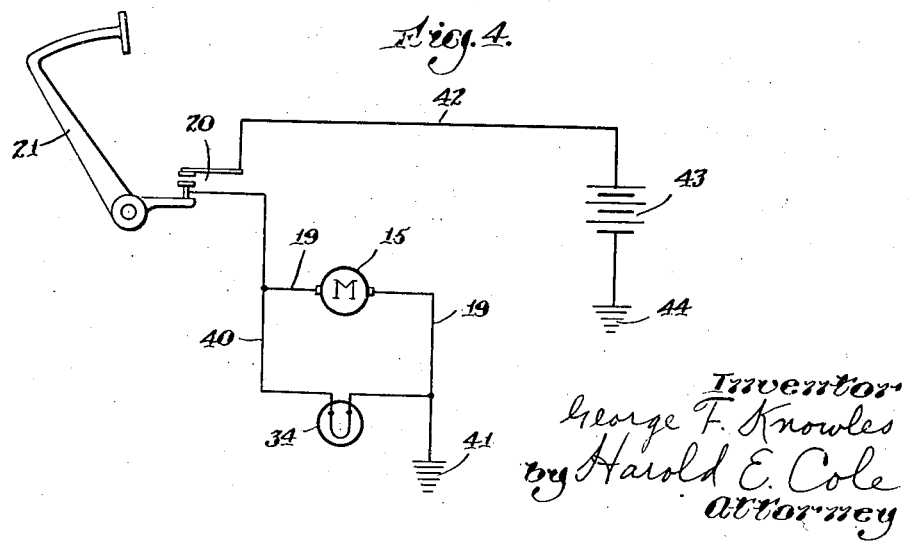
Inventor
George F. Knowles
by Harold E. Cole
Attorney Patented Mar. 9, 1937

2,073,536

UNITED STATES PATENT OFFICE 2,073,536

SIGNAL DEVICE FOR VEHICLES

George F. Knowles, Rehoboth, Mass.

Application December 2, 1935, Serial No. 52,491

1 Claim. (Cl. 177—329)

This invention relates to a signal device for vehicles, which automatically lights and the lighted part moves when an electrical circuit is closed, as by applying a brake pedal.

I am well aware that others have provided wigwag light signals for vehicles which automatically light and move when a brake pedal or other agency is applied; but they have not achieved commercial success to any extent because they are cumbersome, or expensive, or are not startling enough to attract sufficient attention.

One object of my invention is to provide such a device that will attract special attention by automatically moving the whole illuminated portion together with the parts to which it is attached, thereby creating a signaling effect similar to that of a person waving a lighted lantern or the like. Another object is to make said device so simple in construction and operation that the cost of production is low. An additional object is to so make said device that it may readily be attached to any type of automobile without the services of a skilled mechanic. A further object is to provide means to protect the motor for said device from rain, snow or other effects of inclement weather, so that it may operate under the most unfavorable conditions and when it is needed the most.

The foregoing and other objects which will appear as the nature of the invention is better understood, may be accomplished by a construction, combination and operative arrangement of parts such as is disclosed by the drawing and specification. The nature of the invention is such as to render it susceptible to various changes and modifications, and, therefore, I am not to be limited to said disclosure; but am entitled to all such changes therefrom as fall within the scope of my claim.

In the drawing:

Figure 1 is a side elevation view of the rear portion of a motor vehicle with my signal device attached thereto.

Figure 2 is a rear view of a motor vehicle showing my signal device attached thereto, the dot and dash lines indicating the two positions my signal swings to when actuated.

Figure 3 is a longitudinal sectional view showing my device mounted on the fender of a vehicle.

Figure 4 is a wiring diagram, showing my device connected to a brake pedal switch and battery of a motor vehicle.

As illustrated, a motor vehicle 10 has a rear fender 11 to which my device 12 is attached. I use a standard form of electric oscillating motor 15 such as is commonly used to operate windshield wipers. Said motor 15 being mounted on the under side of said fender 11 should preferably be protected from water, mud or the like and I provide an outside casing 16 which surrounds it, being fastened to the said motor 15 by a screw 17, the two ends of said casing fitting around a boss 18 on the said motor. A wire 19 extends from said motor to a yielding switch 20 connected to the brake pedal 21 of the motor vehicle, depression of which brake pedal closes said switch 20 to thereby establish an electrical circuit which illuminates the lantern of my signal device and swings it from side to side. Extending from said motor 15 is a threaded hollow sleeve 23 which extends through said fender 11 and has nuts 24, one on each side of the said fender 11 whereby my device is securely mounted to said fender. A shaft 25 extends from said motor 15 through said sleeve 13 and said fender 11, rotation of which in alternate directions by said motor oscillates the lantern, later described to the two positions indicated by the dot and dash lines in Figure 2 of the drawing. Said shaft 25 extends into one end of a hollow tube 26, being fastened to said tube by a bolt and nut 27. The other end of said hollow tube 26 is flattened as at 30 and fastened to the top portion 29 of my signal lantern and held there by a screw 31 as illustrated in Figure 3 of the drawing. Said screw 31 enters a U-shaped bracket 32 to which the usual lamp socket unit 33 is fastened, having the usual light bulb 34 mounted in it. Said lantern has a glass globe 36 extending from said top portion 29 to a bottom portion 37, being screw threadedly united to said top and bottom portions.

A wire 40 extends from said lamp socket unit 33 through said lantern top portion 29 to said switch 20 being grounded as at 41 to the frame of said vehicle 10. Another wire 42 extends from a battery, or other source of electrical supply 43 to said switch 20, being grounded as at 44 to the frame of said vehicle 10.

Of course, my device need not be connected to the switch actuated by the brake pedal; but could have a separate switch if desired. Also it may be used on other than motor vehicles.

What I claim is:

A signal device comprising a lantern, an oscillating motor embodying an oscillating movable shaft, a tube having a hollow end portion overlappingly connected with the end of said shaft and fixed thereto, the other end of said tube being flattened and said flattened portion being fixed to the top portion of said lantern and providing a support therefor, whereby oscillation of said shaft oscillates said lantern, and electricity transmitting means connected to said motor and adapted to be connected to a source of electrical supply.

GEORGE F. KNOWLES.